(12) United States Patent
Watanabe et al.

(10) Patent No.: US 11,834,761 B2
(45) Date of Patent: Dec. 5, 2023

(54) ADHESIVE TAPE SUBSTRATE WITH GLASS CLOTH AND FLUORINE RESIN, AND ADHESIVE TAPE

(71) Applicant: NITTO DENKO CORPORATION, Ibaraki (JP)

(72) Inventors: Yoshinori Watanabe, Osaka (JP); Hiroki Kigami, Osaka (JP); Yuta Kuroki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 226 days.

(21) Appl. No.: 16/551,302

(22) Filed: Aug. 26, 2019

(65) Prior Publication Data

US 2019/0375963 A1    Dec. 12, 2019

Related U.S. Application Data

(62) Division of application No. 14/394,002, filed as application No. PCT/JP2013/002786 on Apr. 24, 2013, now Pat. No. 10,435,591.

(30) Foreign Application Priority Data

Apr. 27, 2012    (JP) .................. 2012-103209

(51) Int. Cl.
   *C09J 7/21*    (2018.01)
   *B32B 27/32*   (2006.01)
   (Continued)

(52) U.S. Cl.
   CPC ......... *D03D 15/267* (2021.01); *B32B 27/322* (2013.01); *C09J 7/21* (2018.01);
   (Continued)

(58) Field of Classification Search
   CPC ............. C09J 2301/122; C09J 2301/16; C09J 2400/143; C09J 2400/263; C09J 2427/006;
   (Continued)

(56) References Cited

U.S. PATENT DOCUMENTS 3,032,434 A    5/1962    Archibald
3,839,075 A    10/1974   Moriyama et al.
(Continued)

FOREIGN PATENT DOCUMENTS

JP    H05117608    5/1993
JP    H0733884     2/1995
(Continued)

OTHER PUBLICATIONS https://patents.google.com/patent/JP2002086616A/en?oq= 2002086616 (Year: 2000).*

(Continued)

*Primary Examiner* — Arti Singh-Pandey
(74) *Attorney, Agent, or Firm* — Hamre, Schumann, Mueller & Larson, P.C.

(57) ABSTRACT

An adhesive tape substrate production method disclosed in the present description includes the steps of decreasing the amount of a sizing agent contained in a glass cloth by heat; impregnating the glass cloth for which the amount of the sizing agent has been decreased with a dispersion of a fluorine resin; and heating the impregnated glass cloth to a temperature equal to or higher than a melting point of the fluorine resin. Thus, an adhesive tape substrate including the glass cloth impregnated with the fluorine resin is obtained. This method are more productive of adhesive tape substrates and adhesive tapes than conventional methods. In addition, (Continued)

adhesive tape substrates and adhesive tapes for which the occurrence of defects in appearance are reduced can be produced.

4 Claims, 5 Drawing Sheets

(51) Int. Cl.
  *C09J 7/20* (2018.01)
  *D03D 15/267* (2021.01)

(52) U.S. Cl.
  CPC ....... *B32B 2327/12* (2013.01); *B32B 2327/18* (2013.01); *C09J 7/205* (2018.01); *C09J 2301/122* (2020.08); *C09J 2301/16* (2020.08); *C09J 2400/143* (2013.01); *C09J 2400/263* (2013.01); *C09J 2427/006* (2013.01); *D10B 2101/06* (2013.01); *Y10T 442/2098* (2015.04); *Y10T 442/2992* (2015.04); *Y10T 442/3878* (2015.04)

(58) Field of Classification Search
  CPC ....... C09J 7/205; C09J 7/21; Y10T 442/2098; Y10T 442/2992
  See application file for complete search history.

(56) References Cited

U.S. PATENT DOCUMENTS

| | | | | |
|---|---|---|---|---|
| 4,070,257 A | * | 1/1978 | Motani | B01D 39/2024 |
| | | | | 205/517 |
| 5,602,214 A | * | 2/1997 | Lin | C09J 183/02 |
| | | | | 525/478 |
| 9,161,441 B2 | * | 10/2015 | Endo | D03D 1/0082 |

FOREIGN PATENT DOCUMENTS

| | | |
|---|---|---|
| JP | H09207289 | 8/1997 |
| JP | H10259538 | 9/1998 |
| JP | H11302968 | 11/1999 |
| JP | 2001311235 | 11/2001 |
| JP | 2002086616 | 3/2002 |
| JP | 2004123769 | 4/2004 |

OTHER PUBLICATIONS https://www.nitto.com/us/en/others/products/file/datasheet/NJ_No973UL_EN.pdf with an apparent publication date of Dec. 9, 2014 ( see upper right corner of the datasheet document) (Year: 2014).*
https://www.nitto.en/cn/zhc/others/products/group/file/datasheet/NJ_NO.9 73SC_EN.pdf, with an apparent publication date of Oct. 22, 2013 (see upper right corner of the datasheet document) (Year: 2013).*
https://patents.google.com/patent/KR101251141B1/en?oq=KR101251141 (Year: 2010).*

* cited by examiner

ADHESIVE TAPE SUBSTRATE WITH GLASS CLOTH AND FLUORINE RESIN, AND ADHESIVE TAPE

The present application is a divisional application of U.S. application Ser. No. 14/394,002 filed Oct. 10, 2014, issued as U.S. Pat. No. 10,435,591, which is a U.S. national stage application of International Application No. PCT/JP2013/002786 filed Apr. 24, 2013.

TECHNICAL FIELD

The present invention relates to an adhesive tape substrate, more particularly an adhesive tape substrate including a glass cloth impregnated with a fluorine resin, and to an adhesive tape using the substrate. The present invention also relates to methods for producing the adhesive tape substrate and the adhesive tape.

BACKGROUND ART

There is known an adhesive tape in which a glass cloth impregnated with a fluorine resin is used as a substrate and in which an adhesive agent layer is provided on one surface of the substrate (for example, Patent Literature 1). This adhesive tape exhibits high heat resistance derived from the glass cloth and the fluorine resin, and the other surface on which no adhesive agent layer is formed exhibits excellent properties derived from the fluorine resin, such as high releasability and slipperiness; therefore, this adhesive tape is used in various applications. One of the applications is coating of a heat sealing part of a heat sealer. This coating prevents a to-be-heat-sealed object from being fused with the heat sealing part.

A glass cloth is a woven fabric obtained by weaving glass yarns as the warp and weft. In general, glass yarns used as the warp and weft of a glass cloth are each formed by combining several hundreds of glass fibers having a diameter of about several micrometers in a parallel fashion. At this time, a sizing agent (also referred to as a binding agent or a size) for binding the glass fibers together is used. The sizing agent binds the glass fibers together. Also, the sizing agent forms a coating on the surfaces of the fibers, thereby protecting the glass yarns during weaving and preventing fuzzing. Therefore, the use of a sizing agent is essential for formation of glass yarns and glass cloths.

CITATION LIST

Patent Literature

Patent Literature 1; JP 2004-123769 A

SUMMARY OF INVENTION

Technical Problem

Impregnation of a fluorine resin into a glass cloth can be carried out by impregnating the glass cloth with a dispersion of the fluorine resin and then heating the impregnated glass cloth to a temperature equal to or higher than a melting point of the fluorine resin. In the case of production of an adhesive tape substrate including a glass cloth impregnated with a fluorine resin, the impregnation of a fluorine resin dispersion into the glass cloth and the heating of the impregnated glass cloth are repeated until the thickness of the substrate reaches a certain thickness. The larger the required number of repetitions of the impregnation and heating is, the lower the productivity in manufacturing adhesive tape substrates and adhesive tapes is. Aside from this, there may be a case where defects in the appearance of adhesive tape substrates and adhesive tapes are caused by generation of air bubbles and rupture of the generated air bubbles during the heating of the glass cloth impregnated with the fluorine resin dispersion.

An object of the present invention is to provide a method for producing an adhesive tape substrate including a glass cloth impregnated with a fluorine resin and a method for producing an adhesive tape using the substrate, the methods being more productive than conventional methods and being capable of reducing the occurrence of defects in appearance during the production of the substrate and the adhesive tape.

Solution to Problem

A method of the present invention for producing an adhesive tape substrate is a method including: decreasing the amount of a sizing agent contained in a glass cloth by heat; impregnating the glass cloth for which the amount of the sizing agent has been decreased with a dispersion of a fluorine resin; and heating the impregnated glass cloth to a temperature equal to or higher than a melting point of the fluorine resin so as to obtain an adhesive tape substrate including the glass cloth impregnated with the fluorine resin.

A method of the present invention for producing an adhesive tape is a method including providing an adhesive agent layer on one surface of an adhesive tape substrate obtained by the above method for producing the adhesive tape substrate.

An adhesive tape substrate of the present invention includes a glass cloth and a fluorine resin impregnated in the glass cloth. Glass yarns constituting the glass cloth have a cross-section having an aspect ratio of 0.15 or more.

An adhesive tape of the present invention has the above adhesive tape substrate of the present invention and an adhesive agent layer provided on one surface of the adhesive tape substrate.

Advantageous Effects of Invention

The production methods of the present invention are a method for producing an adhesive tape substrate including a glass cloth impregnated with a fluorine resin and a method for producing an adhesive tape using the substrate. The production methods are more productive than conventional methods, and are capable of reducing the occurrence of defects in appearance during the production of the substrate and the adhesive tape.

DESCRIPTION OF EMBODIMENTS

In the production methods of the present invention, a glass cloth for which the amount of a sizing agent contained has been decreased by heat is subjected to impregnation with a fluorine resin dispersion and heating subsequent to the impregnation. Thus, in the state after the impregnation and heating, that is, in the state where a dispersion medium contained in the dispersion has been lost, where the fluorine resin particles have been fused together, and where the fluorine resin has been impregnated in the glass cloth, the width and thickness of the glass yarns (warp and weft) constituting the glass cloth are reduced and increased, respectively, compared with those in the case of using a glass cloth for which the sizing agent amount is not decreased by heat. This thickness increase can reduce the number of times the impregnation of the fluorine resin dispersion into the glass cloth and the heating of the glass cloth subsequent to the impregnation are performed to obtain an adhesive tape substrate having a desired thickness. Thus, the adhesive tape substrate production method and the adhesive tape production method that are more productive than conventional methods are established.

In addition to this, the decrease in sizing agent amount by heat leads to a decrease in the amount of the sizing agent attached to the glass fibers included in the glass yarns constituting the glass cloth, thus resulting in improvement in wettability of the fluorine resin dispersion to the glass fibers. The improvement in wettability makes it easier for the dispersion to infiltrate the glass cloth; therefore, during the heating, generation of air bubbles resulting from expansion of air remaining in the glass cloth and rupture of the generated air bubbles can be prevented. Thus, the adhesive tape substrate production method and the adhesive tape production method are established in which the occurrence of defects in appearance is reduced compared with that in conventional methods. The prevention of generation and rupture of air bubbles makes it possible to reduce the number of times of the impregnation of the fluorine resin dispersion into the glass cloth and the heating of the cloth subsequent to the impregnation. This is because when generation or rupture of air bubbles occurs, it is necessary to scrape the fluorine resin fused with the surface of the glass cloth and it is therefore necessary to carry out again the impregnation of the dispersion and the subsequent heating in order to obtain an adhesive tape substrate having a desired thickness.

As described above, with the production methods of the present invention, an adhesive tape substrate including a glass cloth impregnated with a fluorine resin and an adhesive tape using the substrate can be produced with higher productivity than that of conventional methods while reducing the occurrence of defects in appearance.

[Adhesive Tape Substrate Production Method]

Figure 1:
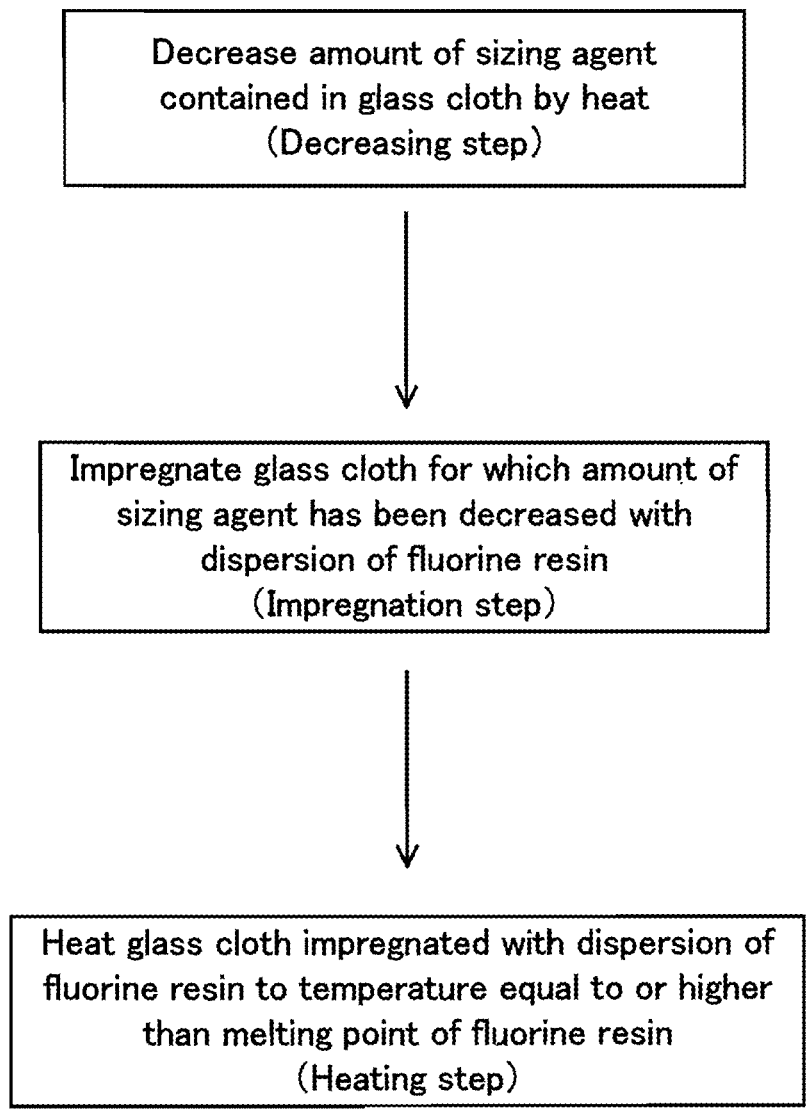
FIG. 1 is a process diagram showing an example of the adhesive tape substrate production method of the present invention.

FIG. 1 shows an example of the adhesive tape substrate production method of the present invention. The production method shown in FIG. 1 includes: a step (decreasing step) of decreasing the amount of a sizing agent contained in a glass cloth by heat; a step (impregnation step) of impregnating, with a dispersion of a fluorine resin, the glass cloth for which the amount of the sizing agent has been decreased in the decreasing step; and a step (heating step) of heating the glass cloth impregnated with the dispersion of the fluorine resin to a temperature equal to or higher than a melting point of the fluorine resin. Thus, an adhesive tape substrate including the glass cloth impregnated with the fluorine resin is obtained. In the heating step, the dispersion medium is lost from the fluorine resin dispersion impregnated into the glass cloth in the impregnation step, the fluorine resin particles are fused together (the dispersion is converted to a fused material), and the glass cloth impregnated with the fluorine resin is formed. The formed glass cloth may be further subjected to repetition of the impregnation step and the heating step where necessary. By this repetition, for example, the thickness of the glass cloth impregnated with the fluorine resin can be increased.

[Decreasing Step]

In the decreasing step, the amount of the sizing agent contained in the glass cloth is decreased by heat. The method for heating the glass cloth for that purpose is not particularly limited; for example, the glass cloth may be heated in a heating furnace. The heating temperature for the glass cloth in the decreasing step may be any temperature at which the sizing agent is decomposed or burnt down by heat; for example, the heating temperature is 300 to 450° C. The heating time is, for example, 5 to 30 minutes. Under these heating conditions, the amount of the sizing agent can be reliably decreased, with deterioration of the glass fibers in the glass cloth being prevented. When the glass fibers are deteriorated, the glass cloth is likely to become fuzzy, which may give rise to problems such as strength reduction and/or poor appearance of the resulting adhesive tape substrate and adhesive tape. Therefore, although the heating conditions may fall outside the above ranges, it is preferable to adjust the heating temperature and the heating time in consideration of deterioration of the glass fibers.

In the decreasing step, for example, the amount of the sizing agent contained in the glass cloth is decreased so that the amount of the sizing agent is 3 weight % or less of the glass cloth (so that the amount of the sizing agent is 3 weight % or less with respect to the total weight of the glass cloth containing the sizing agent). In the decreasing step, the amount of the sizing agent is decreased preferably to 0.5 to 3 weight % of the glass cloth, more preferably to 0.5 to 2 weight % of the glass cloth, and even more preferably to 0.5 to 1 weight % of the glass cloth. The amount of the sizing agent may be decreased to less than 0.5 weight % of the glass cloth; however, in this case, it is desired to be careful about fuzzing of the glass cloth. When the sizing agent is allowed to remain in an amount of at least about 0.5 weight % of the glass cloth, it is easier to carry out the subsequent steps.

The type and structure of the glass cloth are not particularly limited. For example, a glass cloth having a weight per unit area of about 15 to 110 $g/m^2$, warp and weft yarn densities of about 10 to 100 yarns/25 mm, and a thickness of about 10 to 500 μm can be preferably used.

Examples of the sizing agent contained in the glass cloth include: starches such as starch, processed starch, dextrin, and amylose; and synthetic polymer compounds such as carboxymethyl cellulose, polyvinyl alcohol, and acrylamide-vinyl acetate copolymer.

[Impregnation Step and Heating Step]

In the impregnation step, the glass cloth for which the sizing agent amount has been decreased in the decreasing step is impregnated with a fluorine resin dispersion. The impregnation can be carried out, for example, by a method in which the glass cloth is immersed in the fluorine resin dispersion or a method in which the fluorine resin dispersion is applied to the glass cloth (a method using spray coating, for example).

In the adhesive tape substrate production method of the present invention, since the sizing agent amount is decreased in the decreasing step, the wettability of the dispersion to the glass fibers in the glass cloth is improved. In addition, as a result of the decrease in the sizing agent amount by heat, the glass fibers in the glass cloth have become unraveled or at least have become easy to unravel. Therefore, in the impregnation step, the fluorine resin dispersion infiltrates the glass cloth more readily than in conventional methods. Thus, the amount of air remaining in the glass cloth after the impregnation step is reduced; consequently, generation of air bubbles and rupture of the generated air bubbles during the subsequent heating step can be prevented. In addition to this, the dispersion becomes more likely to be infiltrated into the interior of the glass yarns constituting the glass cloth. Depending on the degree of infiltration, the properties (e.g., strength, releasability, slipperiness, electrical properties etc.) of the resulting adhesive tape substrate and adhesive tape are improved. This is because, in the subsequent heating step, the infiltrated dispersion is converted to a fluorine resin phase acting to bind together the glass fibers in the glass yarns.

The fluorine resin is not particularly limited, and is, for example, polytetrafluoroethylene (PTFE), perfluoroalkoxyalkane (PFA), perfluoroethylene-propene copolymer (FEP), ethylene-tetrafluoroethylene copolymer (ETFE), or polyvinylidene fluoride (PVdF). PTFE is preferable from the viewpoint of heat resistance, non-adhesiveness, and ease of processing to the glass cloth.

The fluorine resin dispersion is a solution in which fine fluorine resin particles are dispersed in a dispersion medium. For example, a PTFE dispersion is formed by emulsion polymerization of tetrafluoroethylene (TFE). The content (solid content) of the fluorine resin in the fluorine resin dispersion is preferably about 30 to 60 weight %.

In the heating step, the glass cloth impregnated with the fluorine resin dispersion is heated to a temperature equal to or higher than a melting point of the fluorine resin. Through the heating step, a glass cloth impregnated with the fluorine resin is obtained. At this time, the width and thickness of the glass yarns (warp and weft) constituting the glass cloth are reduced and increased, respectively, compared with those in the case of using a glass cloth not subjected to the decreasing step. The exact cause of such transformation of the glass yarns is not clearly known. One possible explanation is that the glass fibers in the glass cloth have become unraveled or have become easy to unravel as a result of removal of the sizing agent by heat in the decreasing step. More specifically, when the glass fibers are brought into such states, the dispersion of the fluorine resin more readily infiltrates gaps between the glass fibers in the impregnation step, which allows fusion of the fluorine resin particles in the subsequent heating step to proceed in such a manner that the glass fibers are gathered and bound together. On the other hand, in conventional methods which do not include the decreasing step, the sizing agent is lost by heat in the heating step even though it is difficult for the dispersion to infiltrate gaps between the glass fibers in the impregnation step; therefore, the binding between the glass fibers in the glass yarns is weakened.

Due to the reduction in width as well as the increase in thickness of the glass yarns constituting the glass cloth, it is possible to reduce the number of times the impregnation step and the heating step are performed to obtain an adhesive tape substrate having a desired thickness. In addition, since the thickness of the glass cloth itself is increased, the strength and durability as the adhesive tape substrate and adhesive tape are improved compared with those in the case where a desired thickness is achieved by repeated impregnation of the fluorine resin. Furthermore, the occurrence of appearance defects, such as fuzzing of the glass cloth and generation and rupture of air bubbles, is reduced.

The specific method for the heating step is not limited as long as the glass cloth impregnated with the fluorine resin dispersion can be heated to a temperature equal to or higher than the melting point of the fluorine resin. For example, a heating furnace maintained at the temperature can be used in the heating step.

Figure 2:
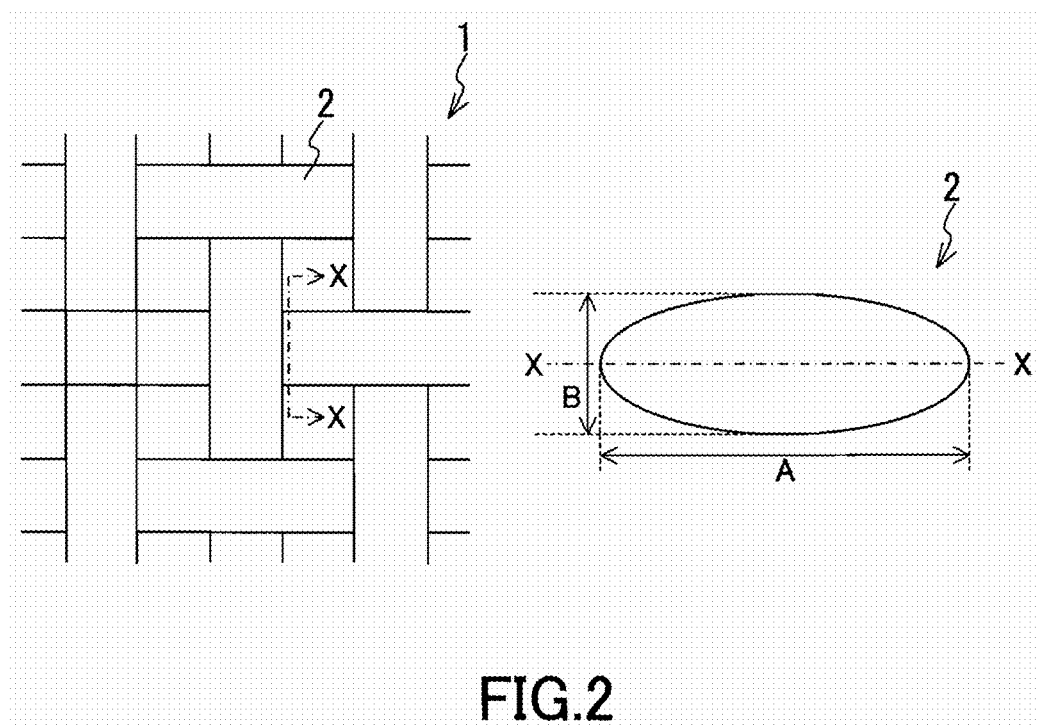
FIG. 2 is a schematic diagram for illustrating an aspect ratio (B/A) of glass yarns constituting an adhesive tape substrate obtained by the adhesive tape substrate production method of the present invention.

The cross-sectional shape of each of the glass yarns constituting the resulting fluorine resin-impregnated glass cloth can be represented, for example, by the aspect ratio of the cross section of the glass yarn. FIG. 2 shows an aspect ratio of a cross-section of a glass yarn. On the left side of FIG. 2 is shown a schematic diagram of a glass cloth 1 viewed in a direction perpendicular to the plane of the cloth. As shown in the schematic diagram, the glass cloth 1 is a woven fabric made of glass yarns 2. A cross-section X-X of one of the glass yarns 2 (cross-section taken along a plane perpendicular to the plane of the glass cloth 1 and perpendicular to the direction in which the glass yarn 2 extends) is shown on the right side of FIG. 2. Although the glass yarn 2 is actually an assemblage of a large number of glass fibers, the glass fibers are omitted from the figure. The aspect ratio of the glass yarn 2 is a value represented by the ratio of a "thickness B" to a "width A", that is, the ratio "B/A", where the width A is the dimension of the glass yarn 2 in the in-plane direction of the glass cloth 1 in the cross-section X-X and the thickness B is the dimension of the glass yarn in the thickness direction of the glass cloth in the cross-section X-X.

The glass yarns constituting a substrate obtained by the adhesive tape substrate production method of the present invention have a cross-section having an aspect ratio B/A of, for example, 0.15 or more. The aspect ratio B/A is preferably 0.15 or more and 0.50 or less, and more preferably 0.15 or more and 0.30 or less.

As long as the effect of the present invention is obtained, the adhesive tape substrate production method of the present invention may include an optional step other than the decreasing step, the impregnation step, and the heating step.

An adhesive tape substrate of the present invention includes a glass cloth and a fluorine resin impregnated in the glass cloth, and the glass yarns constituting the glass cloth have a cross-section having an aspect ratio B/A of 0.15 or more. The aspect ratio B/A in the adhesive tape substrate of the present invention is preferably 0.15 or more and 0.50 or less, and more preferably 0.15 or more and 0.30 or less. The glass cloth and the fluorine resin are as described above.

[Adhesive Tape Production Method and Adhesive Tape]

Figure 3:
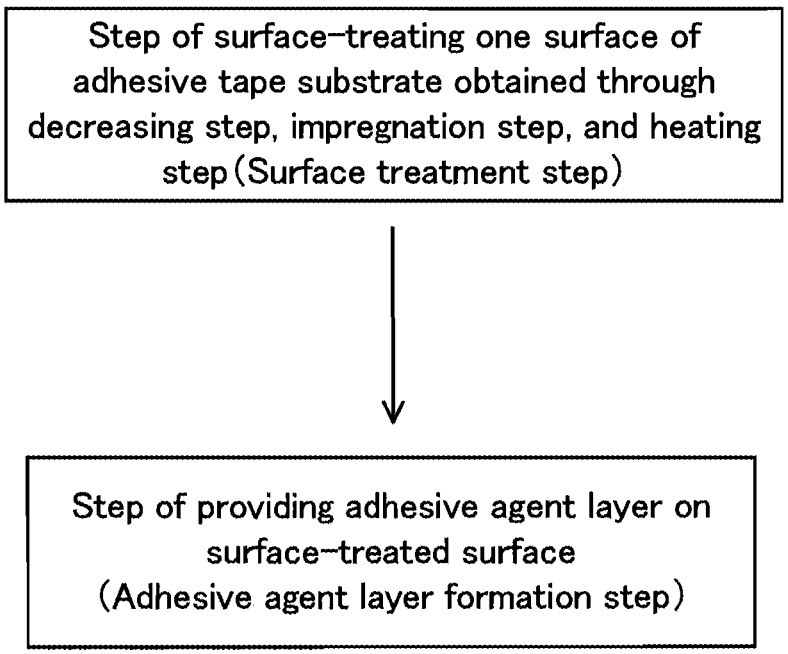
FIG. 3 is a process diagram showing an example of the adhesive tape production method of the present invention.

FIG. 3 shows an example of the adhesive tape production method of the present invention. In the production method shown in FIG. 3, one surface of an adhesive tape substrate obtained by the adhesive tape substrate production method of the present invention, that is, one surface of an adhesive tape substrate obtained through the decreasing step, impregnation step, and heating step described above is subjected to a surface treatment (surface treatment step), followed by providing an adhesive agent layer on the one surface (adhesive agent layer formation step).

[Surface Treatment Step]

The surface treatment step is a treatment for improving bonding strength (anchoring force) between that surface of the adhesive tape substrate on which an adhesive agent layer is to be provided and the adhesive agent layer provided on the surface. This step may be carried out where necessary. The specific method for carrying out the surface treatment step may be the same as a method carried out in production of commonly-known adhesive tapes. The surface treatment step can be carried out, for example, by applying a surface treatment solution (bonding treatment solution) containing a surface treatment agent (bonding treatment agent) and a solvent to the surface of the adhesive tape substrate on which the adhesive agent layer is to be provided.

Examples of the surface treatment agent include a polyester resin, a melamine resin, an acrylic resin, a silicone resin, and a fluorine resin such as PTFE, PFA, and ETFE. Examples of the solvent include toluene, xylene, methyl ethyl ketone, ethyl acetate, butyl alcohol, water, and a mixture thereof.

The surface treatment solution can contain materials other than the surface treatment agent and the solvent, such as a crosslinking agent, a curing agent, an organic filler, an inorganic filler, and a surfactant. The organic filler is, for example, a powder of a melamine resin, an epoxy resin, an acrylic resin or the like. The inorganic filler is, for example, a powder of magnesium oxide, aluminum oxide, silica or the like.

The surface treatment solution is preferably a solution containing a fluorine resin as the surface treatment agent, water as the solvent, silica particles as the inorganic filler, and a surfactant.

[Adhesive Agent Layer Formation Step]

In the adhesive agent layer formation step, an adhesive agent layer is disposed on one surface of the adhesive tape substrate (in the case where the surface treatment step for improving bonding strength is carried out, the one surface is that which has been subjected to the surface treatment step). The specific method for carrying out the adhesive agent layer formation step may be the same as a method carried out in production of commonly-known adhesive tapes. The adhesive agent layer formation step can be carried out, for example, by applying an adhesive agent to one surface of the adhesive tape substrate.

The adhesive agent is not particularly limited; a pressure-sensitive adhesive material conventionally used in an adhesive agent layer of an adhesive tape, such as an acrylic-based, rubber-based, or silicone-based pressure-sensitive adhesive material, can be used. A silicone-based adhesive agent is preferable from the viewpoint of the heat resistance of the adhesive tape.

The thickness of the adhesive agent layer formed in the adhesive agent layer formation step is, for example, 5 to 100 μm.

As long as the effect of the present invention is obtained, the adhesive tape production method of the present invention may include an optional step other than the above-described steps. The optional step is, for example, a winding step of winding the formed adhesive tape around a core.

EXAMPLES

Hereinafter, the present invention will be described in more detail with reference to examples. The present invention is not limited to the examples given below.

Example 1

A glass cloth (thickness=55 μm, weight per unit area=46 g/m$^2$, yarn density=60 yarns (warp)×46 yarns (weft)/25 mm) containing 4 weight % of polyvinyl alcohol as a sizing agent was heated at 300° C. for 20 minutes to decrease the amount of the sizing agent contained in the glass cloth to 0.5 weight %. The amount of the sizing agent contained in the glass cloth was determined by increasing the temperature of the glass cloth from ordinary temperature to 500° C. at a temperature increase rate of 10° C./minute and then by maintaining the temperature at 500° C. for 1 hour. The difference in the weight of the glass cloth before and after this heating corresponds to the amount of the sizing agent contained in the glass cloth. The way of determining the amount of the sizing agent contained in the glass cloth was the same for the later-described example and comparative example.

Figure 4:
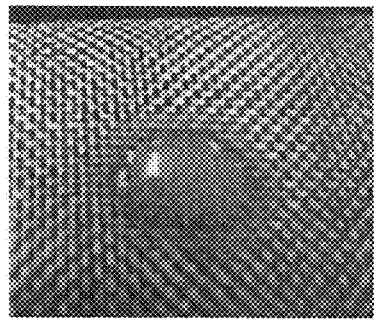
FIG. 4 shows the results of evaluation of wettability of fluorine resin dispersions to glass cloths in examples.
Figure 4:
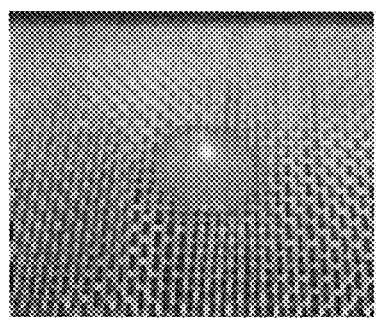
Figure 4:
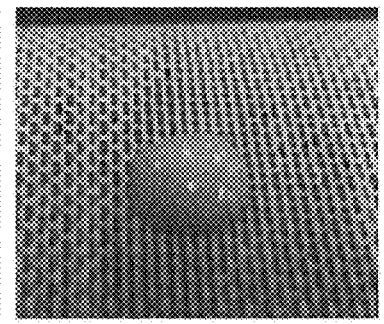

Next, a drop of a PTFE dispersion (AD 938L manufactured by AGC, solid content=60 weight %) was applied to a surface of the glass cloth for which the sizing agent amount was decreased to 0.5 weight %, and how the PTFE dispersion infiltrated the glass cloth was observed (evaluation of wettability of the glass cloth by the PTFE dispersion). The state of the infiltration observed 30 seconds after the application of the drop is shown in FIG. 4. As shown in FIG. 4, the PTFE dispersion infiltrated the interior of the glass cloth, and spread around that portion of the glass cloth to which the drop of the dispersion was applied.

Aside from the observation of wettability, an impregnation step was carried out. Specifically, the above glass cloth for which the sizing agent amount was decreased to 0.5 weight % was immersed in the above PTFE dispersion, after which the glass cloth was drawn out of the PTFE dispersion, with doctor knives being pressed against both surfaces of the glass cloth. The pressing by the doctor knives was performed to remove the PTFE dispersion applied to the surfaces of the glass cloth, for the purpose of evaluating the thickness of the adhesive tape substrate obtained by a single series of impregnation and heating. The impregnation step in the later-described example and comparative example was carried out in the same manner.

Figure 5A:
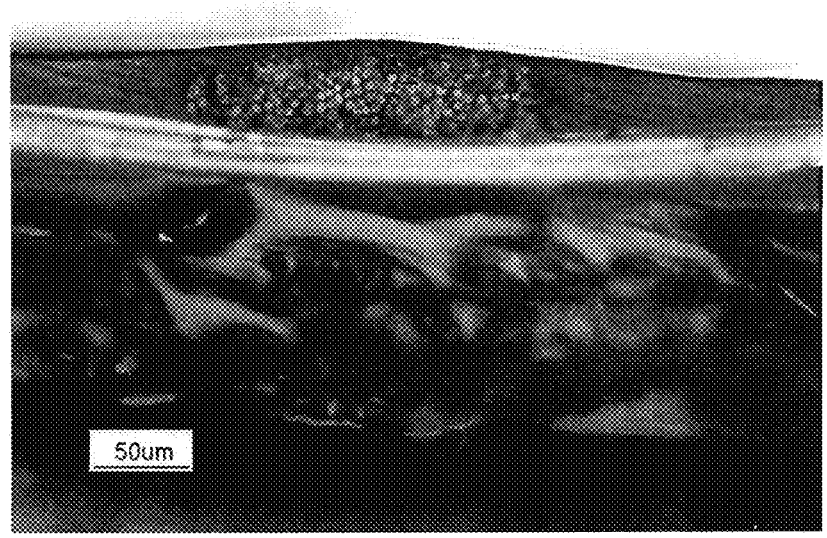
FIG. 5A shows an optical microscope image of a cross-section of an adhesive tape substrate fabricated in Example 1.

Next, the glass cloth drawn out was heated at 380° C. for 3 minutes to obtain a 74-μm-thick adhesive tape substrate impregnated with PTFE. Thereafter, the impregnation with the PTFE dispersion and the heating subsequent to the impregnation were repeated four times; as a result, an 80-μm-thick adhesive tape substrate impregnated with PTFE was obtained. By observing a cross-section of the obtained adhesive tape substrate with an optical microscope, the aspect ratio (thickness B/width A) of glass yarns constituting the glass cloth of the substrate was evaluated; the aspect ratio was 0.21. In addition to this, it was confirmed by optical microscope observation that PTFE entered gaps between the glass fibers in the glass yarns, and that the glass fibers were bound together via the PTFE having entered the gaps. An optical microscope image of the cross-section of the obtained adhesive tape substrate is shown in FIG. 5A. The aspect ratio (B/A) was determined from the maximum width and maximum thickness of the glass yarns in the cross-section. The way of determining the aspect ratio was the same for the later-described example and comparative example.

Next, to one surface of the thus-obtained adhesive tape substrate was applied a 40 weight % toluene solution of a silicone adhesive agent (KR-120 manufactured by Shin-Etsu Chemical Co., Ltd.) (1 part by weight of benzoyl peroxide was added per 100 parts by weight of the adhesive agent) so that the dried coating thickness would be 45 μm. Thereafter, the entire resulting product was dried at 80° C. for 3 minutes and then at 200° C. for 5 minutes to obtain an adhesive tape. The appearance of the obtained adhesive tape was observed;

the adhesive tape had a good appearance free from defects attributed to generation of air bubbles and to air bubbles.

Example 2

The glass cloth used in Example 1 was heated at 340° C. for 10 minutes to decrease the amount of the sizing agent contained in the glass cloth to 2 weight %. A drop of the PTFE dispersion used in Example 1 was applied to a surface of the glass cloth for which the sizing agent amount was decreased to 2 weight %, and how the PTFE dispersion infiltrated the glass cloth was observed. The state of the infiltration observed 30 seconds after the application of the drop is shown in FIG. 4. As shown in FIG. 4, the PTFE dispersion infiltrated the interior of the glass cloth, and spread around that portion of the glass cloth to which the drop of the dispersion was applied. However, the extent of spread was smaller than that in Example 1.

Aside from the observation of wettability, the above glass cloth for which the sizing agent amount was decreased to 2 weight % was immersed in the above PTFE dispersion, after which the glass cloth was drawn out of the PTFE dispersion, with doctor knives being pressed against both surfaces of the glass cloth.

Next, the glass cloth drawn out was heated at 380° C. for 3 minutes to obtain a 68-μm-thick adhesive tape substrate impregnated with PTFE. Thereafter, the impregnation with the PTFE dispersion and the heating subsequent to the impregnation were repeated six times; as a result, an 80-μm-thick adhesive tape substrate impregnated with PTFE was obtained. By observing a cross-section of the obtained adhesive tape substrate with an optical microscope, the aspect ratio (B/A) of glass yarns constituting the glass cloth of the substrate was evaluated; the aspect ratio was 0.17. In addition, it was confirmed by optical microscope observation that PTFE entered gaps between the glass fibers in the glass yarns, and that the glass fibers were bound together via the PTFE having entered the gaps.

Next, on one surface of the thus-obtained adhesive tape substrate was formed an adhesive agent layer in the same manner as in Example 1. Thus, an adhesive tape was obtained. The appearance of the obtained adhesive tape was observed; the adhesive tape had a good appearance free from defects attributed to generation of air bubbles and to air bubbles.

Comparative Example

The glass cloth used in Example 1 was not heated, and the amount of the sizing agent contained was maintained at 4 weight %. A drop of a PTFE dispersion was applied to the glass cloth in the same manner as in Example 1. A state observed 30 seconds after the application of the drop is shown in FIG. 4. As shown in FIG. 4, the PTFE dispersion hardly infiltrated the interior of the glass cloth, but remained on the surface of the glass cloth.

Aside from the observation of wettability, the glass cloth for which the amount of the sizing agent contained was not decreased was immersed in the above PTFE dispersion, after which the glass cloth was drawn out of the PTFE dispersion, with doctor knives being pressed against both surfaces of the glass cloth.

Figure 5B:
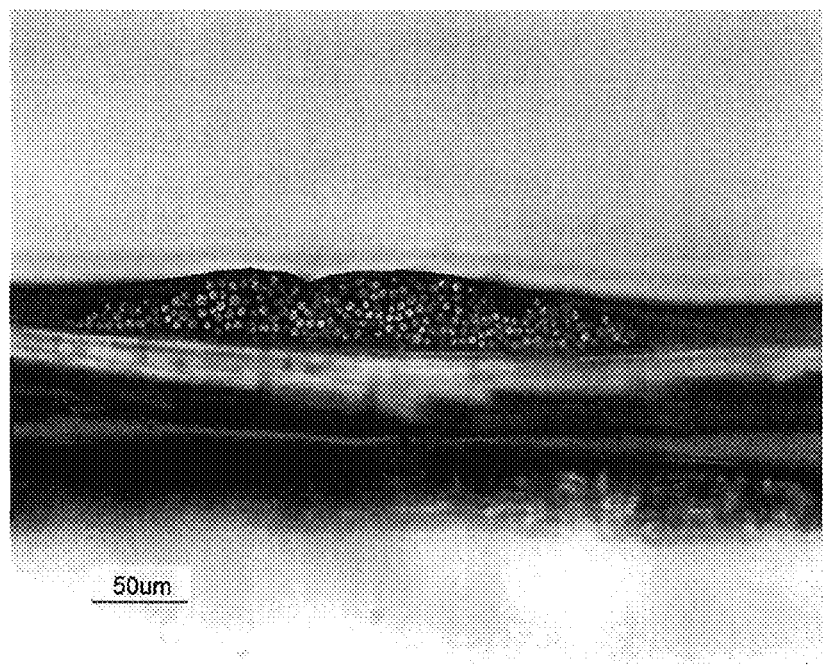
FIG. 5B shows an optical microscope image of a cross-section of an adhesive tape substrate fabricated in Comparative Example.

Next, the glass cloth drawn out was heated at 380° C. for 3 minutes to obtain a 62-μm-thick adhesive tape substrate impregnated with PTFE. Thereafter, the impregnation with the PTFE dispersion and the heating subsequent to the impregnation were repeated ten times; as a result, an 80-μm-thick adhesive tape substrate impregnated with PTFE was obtained. By observing a cross-section of the obtained adhesive tape substrate with an optical microscope, the aspect ratio (B/A) of glass yarns constituting the glass cloth of the substrate was evaluated; the aspect ratio was 0.12. In addition, it was confirmed by optical microscope observation that PTFE did not enter gaps between the glass fibers in the glass yarns. An optical microscope image of the cross-section of the obtained adhesive tape substrate is shown in FIG. 5B. As shown in FIG. 5B, the cross-sectional shape of the glass yarns was completely different from that in Example 1.

Next, on one surface of the thus-obtained adhesive tape substrate was formed an adhesive agent layer in the same manner as in Example 1. Thus, an adhesive tape was obtained. The appearance of the obtained adhesive tape was observed; the presence of many appearance defects attributed to generation of air bubbles was confirmed.

Results for Examples 1 and 2 and Comparative Example are collectively shown in the following Table 1.

TABLE 1

|  | Example 1 | Example 2 | Comparative Example |
| --- | --- | --- | --- |
| Amount of sizing agent after decreasing treatment | 0.5 weight % | 2 weight % | Decreasing treatment was not carried out |
| Wettability (FIG. 4) | Infiltrated | Infiltrated | Hardly infiltrated |
| Thickness of glass cloth (substrate) after first impregnation and heating treatment | 74 μm | 68 μm | 62 μm |
| Aspect ratio (B/A) of glass yarn after formation of 80-μm-thick substrate | 0.21 | 0.17 | 0.12 |
| Appearance of adhesive tape | Good | Good | Defects attributed to air bubbles occurred in large numbers |

INDUSTRIAL APPLICABILITY

An adhesive tape substrate and an adhesive tape obtained by the production methods of the present invention can be used in the same applications as conventional adhesive tape substrates and adhesive tapes impregnated with a fluorine resin.

DESCRIPTION OF REFERENCE NUMERALS

1 Glass cloth

2 Glass yarn

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

The invention claimed is:

1. An adhesive tape substrate comprising a glass cloth and a fluorine resin impregnated in the glass cloth,
   wherein the glass cloth includes glass yarns,
   each of the glass yarns is included in the glass cloth as a warp or a weft thereof and is an assemblage of glass fibers,
   the glass yarn has a cross-section having an aspect ratio in a range from 0.15 to 0.50,
   wherein the aspect ratio is a ratio of a thickness of the glass yarn relative to a width thereof in the cross-section, where the cross-section is taken along a plane perpendicular to a surface of the glass cloth and perpendicular to a direction in which the glass yarn extends, and
   the glass fibers included in each of the glass yarns are bound together via the fluorine resin that has entered gaps formed between the glass fibers.

2. An adhesive tape comprising:
   the adhesive tape substrate according to claim 1; and
   an adhesive agent layer provided on one surface of the adhesive tape substrate.

3. The adhesive tape substrate according to claim 1, wherein
   a material present in the gaps between the glass fibers consists of the fluorine resin.

4. The adhesive tape substrate according to claim 1, wherein the adhesive tape substrate consists of:
   the glass cloth; and
   the fluorine resin that is impregnated in the glass cloth.

* * * * *